L. S. LUNDY.
TRANSPLANTING POT.
APPLICATION FILED MAY 28, 1910.

971,909.

Patented Oct. 4, 1910.

WITNESSES.

INVENTOR
L. S. LUNDY.

UNITED STATES PATENT OFFICE.

LUNDY SHANNON LUNDY, OF NIAGARA FALLS SOUTH, ONTARIO, CANADA.

TRANSPLANTING-POT.

971,909.

Specification of Letters Patent.  Patented Oct. 4, 1910.

Application filed May 28, 1910. Serial No. 563,972.

*To all whom it may concern:*

Be it known that I, LUNDY SHANNON LUNDY, of the town of Niagara Falls South, in the county of Welland, in the Province of Ontario, Canada, have invented certain new and useful Improvements in Transplanting-Pots, of which the following is the specification.

My invention relates to improvements in transplanting boxes or pots, and the object of the invention is to devise a pot or box of this character in which the plant may be readily transplanted without disturbing the soil within which it is originally planted and cut worms, black grubs or other pests getting at the young plant.

My invention consists of a box made of a sheet of paper or other suitable material in folded or collapsed form and comprising two walls, one located within the other and the outer wall being provided at the bottom with notches, the box being set up for use by spreading the sides apart into box form, the parts being arranged as hereinafter more particularly explained.

Figure 1:
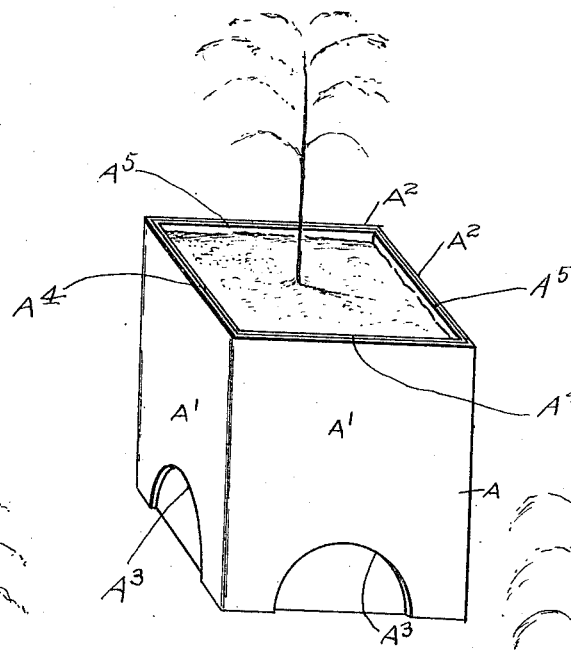
Figure 2:
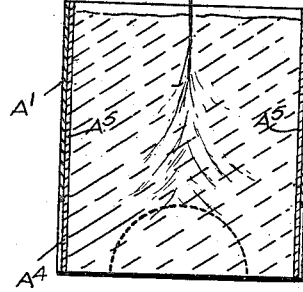
Figure 3:
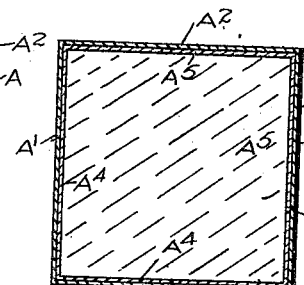
Figure 4:
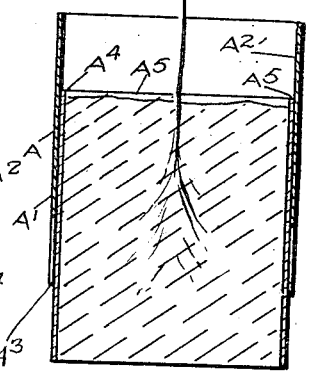
Figure 5:
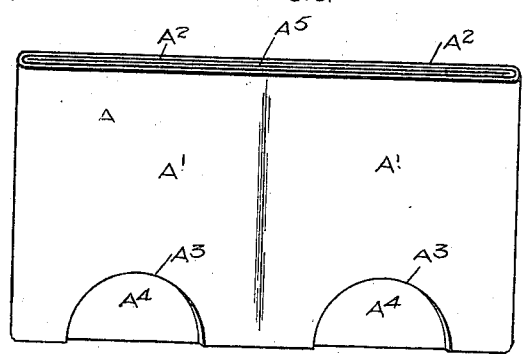

Figure 1, is a view of my box set up and containing soil and a plant located therein. Fig. 2, is a vertical section of Fig. 1. Fig. 3, is a sectional plan. Fig. 4, is a sectional view showing the outer wall extended upwardly beyond the top edge of the inner wall ready to be put into the ground. Fig. 5, is a view showing the box in its collapsed condition.

In the drawings like letters of reference indicate corresponding parts in each figure.

A is the outer wall of the box, which is shown in folded or collapsed form having the sides $A^1$ $A^1$ lying parallel to the sides $A^2$ $A^2$. The sides $A^1$ $A^1$ and $A^2$ $A^2$ are provided with notches $A^3$. $A^4$ $A^4$ are the sides of the inner wall, which are located opposite the sides $A^5$ $A^5$ and are necessarily parallel therewith being incased by the outer walls $A^1$ and $A^2$. The box is bottomless.

In using my box all it is necessary to do is to take the form shown in Fig. 5 and open it up into box form and fill it with the soil and place the plant therein.

It will be noticed that the box is without any bottom. When so planted the box and contents thereof are left in the hot houses until ready for removal to the open field. When this period arrives all that it is necessary to do is to hold the inner wall by the thumb and fingers by gripping it within the notches $A^3$. The other hand may be employed to press down on the soil around the plant. This will serve to push the outer box up to the desired height. The plant box or pot may now be placed in the ground up to the top of the inner wall, thus leaving the outer wall above the ground and making it impossible for cut worms or black grubs to cut off the plant.

By planting the pot or box in the ground you do not disturb the roots of the plant and such plant may be placed in the ground in the hottest weather without wilting or being lost.

Another advantage accruing from the use of my invention is that in forcing plants under glass some get more light than others and require to be moved to another place and these pots will allow of this being done.

The boxes or pots being in collapsed form when shipped are very convenient and reduce freight charges.

What I claim as my invention is:

1. A transplanting pot comprising an outer wall provided with bottom notches in the sides thereof, and an inner wall located within the outer wall and capable of telescopic movement within the same said box having both ends open as and for the purpose specified.

2. A transplanting pot comprising an outer wall of foldable material provided with bottom notches in the sides thereof and an inner wall of foldable material located within the outer wall and capable of telescopic movement within the same said box having both ends open as and for the purpose specified.

3. A transplanting pot comprising an outer wall of foldable material provided with bottom notches in the sides thereof and an inner wall of foldable material located within the outer wall and capable of telescopic movement within the same said box having both ends open, the sides being designed to lie in flat form one against the other in the collapsed condition as and for the purpose specified.

4. A transplanting pot comprising an outer wall provided with bottom notches in the sides thereof, and an inner wall located within the outer wall and capable of telescopic movement within the same, both walls being bottomless as and for the purpose specified.

LUNDY SHANNON LUNDY.

Witnesses:
    JOHN SHAW,
    WILLIAM BOWMAN.